United States Patent [19]
Reinicke

[11] Patent Number: 5,450,871
[45] Date of Patent: Sep. 19, 1995

[54] METHOD OF MAKING A MAGNETICALLY LINKED MULTI-VALVE SYSTEM

[75] Inventor: Robert H. Reinicke, Mission Viejo, Calif.

[73] Assignee: Marotta Scientific Controls, Inc., Montville, N.J.

[21] Appl. No.: 335,321

[22] Filed: Nov. 7, 1994

Related U.S. Application Data

[62] Division of Ser. No. 194,722, Feb. 14, 1994, Pat. No. 5,404,908.

[51] Int. Cl.⁶ .................................................. F16K 31/06
[52] U.S. Cl. ...................................... 137/15; 137/315; 137/595; 251/129.15; 251/367
[58] Field of Search ............... 137/15, 315, 595, 884; 251/129.15, 367

[56] References Cited

U.S. PATENT DOCUMENTS

| | | | |
|---|---|---|---|
| 3,064,936 | 11/1962 | Strauss | 251/367 X |
| 3,073,341 | 1/1963 | Schernekau | 251/367 X |
| 3,472,277 | 10/1969 | Reinicke | 137/595 |
| 3,495,604 | 2/1970 | Trask | 137/15 |
| 3,534,757 | 10/1970 | Doherty | 137/15 |
| 3,661,178 | 5/1972 | Wichmann | 137/595 |
| 5,269,490 | 12/1993 | Fujikawa et al. | 137/884 X |

FOREIGN PATENT DOCUMENTS 892097 12/1981 U.S.S.R. .......................... 137/595

Primary Examiner—Stephen M. Hepperle
Attorney, Agent, or Firm—Hopgood, Calimafde, Kalil & Judlowe

[57] ABSTRACT

The invention contemplates a method of making a valve body for a magnetically actuated twin-valve system, wherein the valve body comprises a body block of three relatively thick slabs vertically bonded to each other and to the consolidated height of their combined thicknesses, the first and lower most slab being of non-magnetic material, the second and intermediate slab being of magnetic material, and the third and uppermost slab being of non-magnetic material; the method comprises the steps of (a) inertia-welding said slabs to each other; and (b) machining first and second spaced valve-member guide bores through said second and third slabs and through at least a portion of said first slab, with a valve-seat opening at the otherwise closed lower end of each bore of said first slab and with independent lateral-access inlet-port communication with the respective bores in said first slab.

16 Claims, 2 Drawing Sheets

METHOD OF MAKING A MAGNETICALLY LINKED MULTI-VALVE SYSTEM

This application is a division of original application Ser. No. 08/194,722, filed Feb. 14, 1994, now U.S. Pat. No. 5,404,908.

BACKGROUND OF THE INVENTION

The invention relates to an electromagnetically operated valve construction, wherein a single magnetic circuit places plural valve members of magnetic material in series magnetically interlinked relation, so that a single electrical excitation coupled to the single magnetic circuit can simultaneously operate the plural valves and thus simultaneously control independent flows of separate pressure fluids through the respective valves.

U.S. Pat. Nos. 3,443,585, 3,472,277 and 4,223,698 disclose various magnetically actuated valve systems wherein a single electromagnetic excitation will actuate each of two valve members, each of which serves its own pressure-fluid flow. In U.S. Pat. No. 3,443,585, a permanent magnet is the common middle leg of two separate solenoid-actuated magnetic circuits. Excitation of one solenoid opens both valves; excitation of the other solenoid closes both valves, and the permanent magnet holds the actuated condition of both valves. U.S. Pat. Nos. 3,472,277 and 4,223,698 each disclose an electromagnetic actuating system wherein a single solenoid coil actuates two magnetically linked valves to open condition, against the compliant action of springs to load valve members in the valve-closing direction. In all cases, construction is highly specialized and complex, leading to unduly expensive products.

BRIEF STATEMENT OF THE INVENTION

It is an object of the invention to provide an improved electromagnetically actuated multiple-valve construction of the character indicated.

A specific object is to meet the above object with a novel valve-body construction and method of making the same, lending itself to greater precision in the final product and requiring materially less manufacture of subassemblies that must be assembled to each other.

Another specific object is to achieve the foregoing objects with a minimum number of seals to assure against leakage and/or mixture of separate pressure fluids that are being independently controlled by the respective valves of the system.

The invention achieves the foregoing objects by relying upon a valve-body construction wherein relatively thick non-magnetic and magnetic slabs are bonded into a consolidated body block, in laminated alternation, prior to machining the same to serve the dual-valve purposes of the invention. In the embodiment to be described, the uppermost slab is non-magnetic, the next-adjacent slab is magnetic, and the lowermost slab is non-magnetic. Two spaced guide bores through the body block accommodate movement of separate valve members of magnetic material; the upper end of each of these valve members is upwardly exposed in confronting relation with one to the exclusion of the other pole face of the U-shaped core of an electromagnet, whereby a single magnetic circuit, established by the U-shaped core and the valve members, relies upon the middle slab of magnetic material to complete the circuit by magnetically linking both valve members. Inlet and outlet flows of pressure fluid pass through separate chambers formed primarily in the lowermost slab on the respective guide-bore alignments. Except for a valve-seat and outlet, each valve chamber is closed at its lower end, and spring means reacting between the pole faces of the U-shaped core and the respective valve members normally urge the valve members into seated, valve-closed coaction with their valve seats. Electrical excitation is effective to displace both valve members to valve-open position, against preloaded spring action; and the preloaded spring action assures valve closure when electrical excitation ceases.

DESCRIPTION OF THE DRAWINGS

The invention will be described in detail for a preferred embodiment, in conjunction with the accompanying drawings, in which.

DETAILED DESCRIPTION

Figure 1:
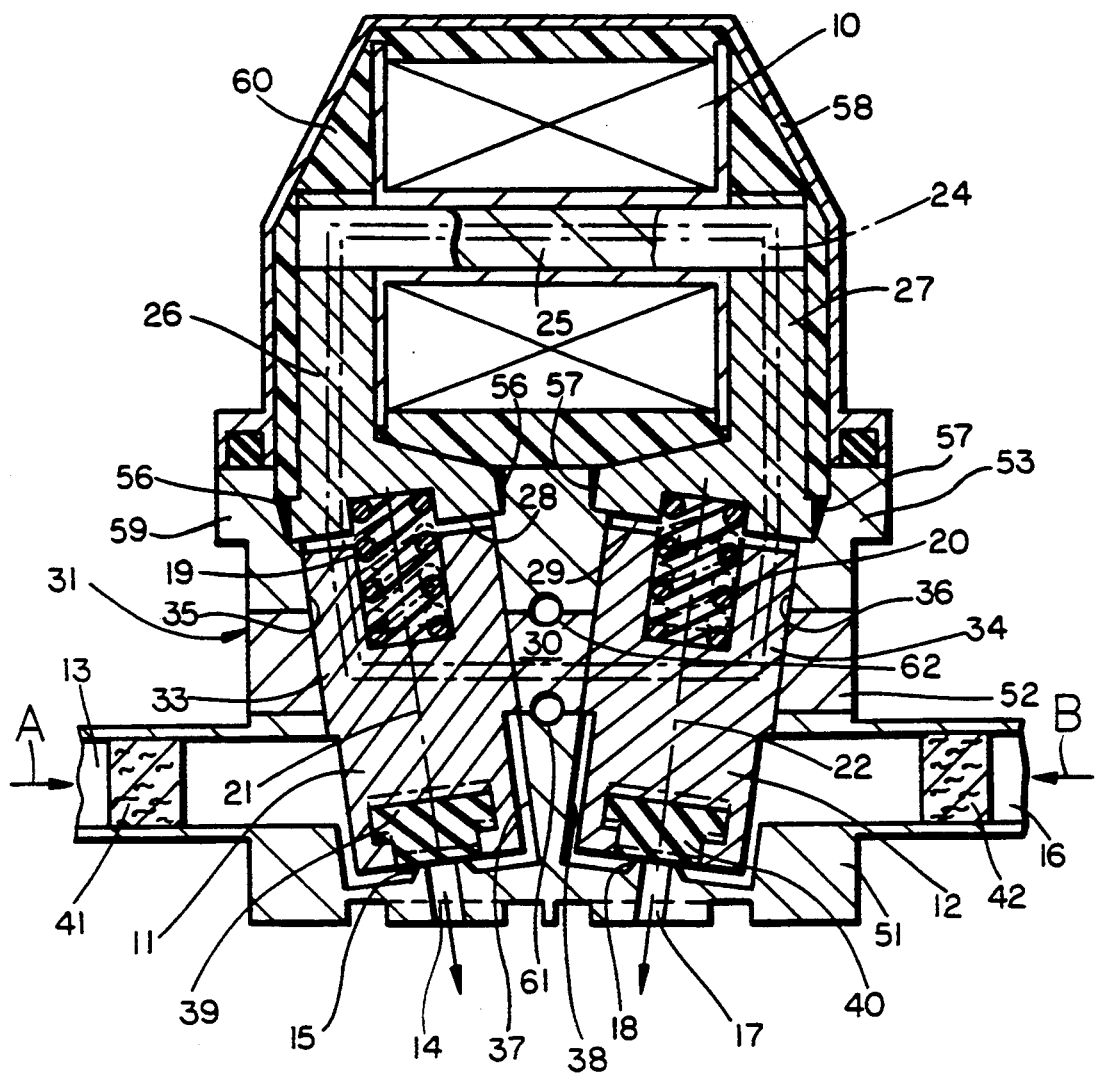
FIG. 1 is a vertical section through a twin-valve system of the invention, wherein the section plane is defined by the displacement axes of the respective valves.

In the description which follows, the expressions "upper", "upward", "lower", and "downward" are used to simplify description of the orientation shown in the drawings, and it will be understood that the structure to be described can function in any orientation, i.e., without the gravitational context that might otherwise be suggested by such expressions. Also, the expressions "magnetic" and "magnetic material" will be understood to apply to the property of conducting magnetic flux, whereas the expressions "non-magnetic" and "non-magnetic material" will be understood to apply to a relative inability to conduct magnetic flux.

Referring initially to FIG. 1, the invention is shown in application to an electromagnetically operated valve of the normally closed variety, wherein a single electrical winding or solenoid 10 is excited to concurrently open two valves, by upwardly displacing their respective valve members 11, 12 from their valve-closed position shown. A first pressure-fluid passage is thus opened between an inlet 13 for a first-fluid flow A to an outlet 14, via a valve-seat formation 15; at the same time, a second pressure-fluid passage is also thus opened between an inlet 16 for a second-fluid flow B to an outlet 17, via a valve-seat formation 18. Separate preload springs 19, 20 normally urge the respective valve members 11, 12 to valve-closed position, i.e., in the absence of electrical excitation of winding 10. The valve members 11, 12 are guided for axial displaceability on axes 21, 22 which define an upstanding geometric plane and which are oppositely inclined for convergence in the downward direction. Such convergence is not a requirement of the invention but it is a useful feature when the valve is to serve flows of reacting propellant fluids (more commonly called propellants), such as nitrogen tetroxide (oxidizer) at A and monomethyl hydrazine (fuel) at B to the combustion chamber of a rocket engine at B to the combustion chamber of a rocket engine (not shown), but fitted to receive the separate A and B discharges via valve outlets 14, 17.

A phantom double-line loop 24 in FIG. 1 schematically indicates the path of magnetic flux in the magnetic circuit, in response to excitation of winding 10. As shown, this path is established by a cylindrical magnetic element 25 which is the central portion of a generally U-shaped core including two spaced downwardly directed magnetic legs 26, 27, establishing pole faces 28, 29, each of which, in the valve-closed position shown, is spaced by a short gap to the confronting upper-end face of one of the valve members 11, 12. The valve members 11, 12 are of magnetic material, and a central magnetic part 30 of valve-body structure 31 enables the valve members and part 30 to complete the magnetic circuit (24) that is excitable by winding 10.

Each of the valve members 11, 12 is axially elongate, having an upper portion 33 (34) that is cylindrical, with guided running clearance within a guide bore 35 (36) centered on one of the axes 21 (22). Cylindrical bores in each pole face 28 (29) confront opposing cylindrical bores in the upper end of each valve member for centered location of the preload springs 19 (20). As shown, each guide bore 35 (36) continues downward to establish a valve-chamber wall 37 (38) that communicates with the respective inlet passages 13 (16); and throughout the valve-chamber region each valve member 11 (12) is of slightly reduced diameter, in generous radial clearance with chamber-wall structure. The lower end of each guide bore 35 (36) terminates short of the bottom of the valve body, except for the valve-seat and outlet-passage formations previously noted. Finally, the lower end of each valve member is fitted with a poppet element 39 (40) having sufficient resilience to assure valve closure at its position of valve-seat engagement.

Filtering means 41 (42) are schematically shown in the respective inlet passages 13, 16 for removal of any solid matter which might impair the fidelity of valve-open, valve-close action in response to electromagnetic valve-opening actuation via winding 10, or valve-closing preload actuation via springs 19, 20.

The construction and nature of valve-body structure 31 is an important feature of the invention and will be discussed in further reference to FIG. 2 of the drawings.

The body structure 31 is basically a prismatic block comprising three flat slabs 51, 52, 53 of magnetic and non-magnetic materials that have been bonded in face-to-face relation prior to machining of any of the bores or other features of the valve body. In the construction shown, the first or lowermost slab 51 is non-magnetic and is relatively thick, sufficient to be machined (after consolidation with slabs 52 and 53) for definition of the valve-chamber walls 37, 38, as well as the respective inlet passages 13, 16 communicating therewith, and the valve-seat and outlet-passage formations. The second or intermediate slab 52 is of magnetic material, of lesser thickness that is nevertheless sufficient to establish the short bridging flux-path connection 30 which completes linkages of the two valve-members in the magnetic-circuit loop 24. And the third or uppermost slab 53 is also relatively thick, for stable guidance availability for the valve members, via bores 35, 36. The three slabs may be bonded or otherwise permanently consolidated to the block from which body 31 is later machined, but a preference is indicated that these slabs be initially characterized by relatively rough surface texture and that they be consolidated by the technique known as inertia-welding, wherein friction at slab-to-slab interfaces establishes a permanent fusion of the slabs to each other. Reference is made to an undated booklet, "Interia/Friction Welding-Application Principles", available from Interface Welding, Carson, Calif., for discussion of inertia welding which is not per se a part of the present invention.

The most important machining operation is the formation of the two upwardly open bores 35, 36 which serve as valve-member guide bores in their passage through the second and third slabs 52, 53, and which serve to provide valve-chamber walls in their limited passage into the lowermost slab 51. Tooling for this machining will depend upon hardness properties and tolerance specifications for three slabs, and EDM machining is well suited to the purposes, including the formation of a valve seat at the bottom of each of these bores. The same may be said for the small-diameter bores of outlet passages 14, 27 and for the lateral boring needed in slab 51 to provide inlet passages 13, 16, insofar as these passages are within the body block 31. It is difficult in a single diagram to depict all details of such machining, but lightly dashed elongate outlines at 35', 36' between phantom ends 35a, 35b (36a, 36b) can be taken as suggestive of the valve-guidance portion of bores 35, 36 through slabs 52, 53; and the lightly dashed elongate outlines at 35'', 36'' between phantom ends 35b, 35c (36b, 36c) can be taken as suggestive of the valve-chamber portion of bores 35, 36, extending well into the lowermost slab 51.

Before assembly of the U-shaped core (and its winding 10) to the bored block 31, the respective valve members 11, 12 (which will be understood to have been separately fabricated) and their preload springs 19, 20 are assembled to body block 31 via the open ends of bores 35, 36, and to the point of poppet (39, 40) engagement with associated valve seats 15, 18.

Figure 2:
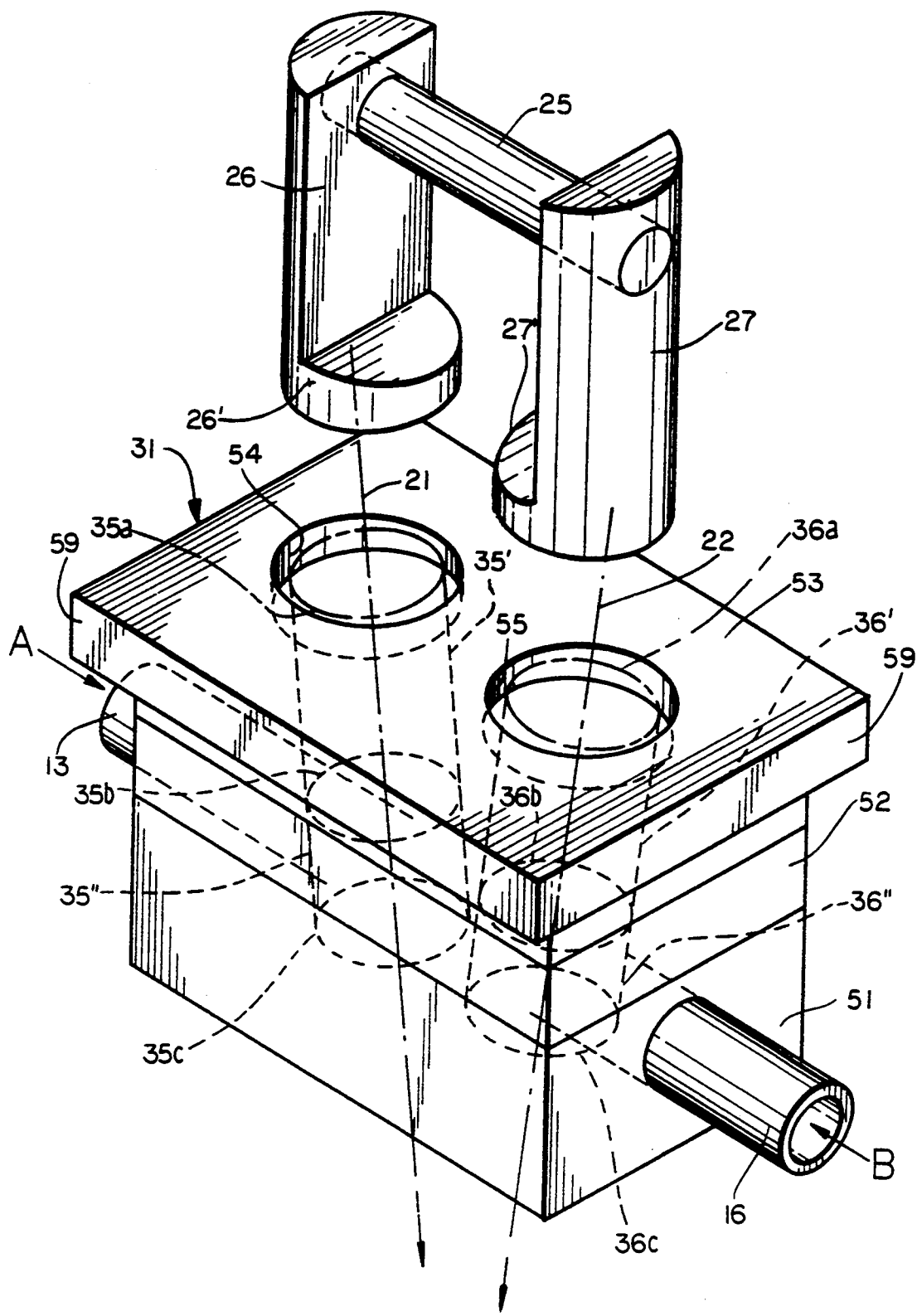
FIG. 2 is a simplified isometric diagram of valve-body structure in FIG. 1.

FIG. 2 also shows magnetic components of the U-shaped core which must be secured to the body block 31. Each of the spaced legs 26, 27 of this core is seen to comprise a short cylindrical pole-face region 26', 27', with remaining upwardly projecting leg structure that is interconnected by the central core element 25 (about which winding 10 is developed). The lower surface of each pole face region 26', 27' is truncated at an inclination (see FIG. 1) which uniformly confronts the slope of the upper end of the valve member with which it is to react. And counterbores 54, 55 at the upper end of bores 35, 36 are sized for accurate insertional location of the pole face regions therein, with the upper ends of springs 19, 20 located in the spring-retaining bores of the pole faces. As seen in FIG. 1, the pole-face connections to counterbores 54, 55 are completed and made permanent by peripherally continuous welding, preferably electron-beam welding, suggested at 56, 57.

Upon thus-welded consolidation of pole-face connections to the counterbores 54, 55 of the non-magnetic upper slab 53 (it being understood that winding 10 is incorporated in such consolidation of its core connections), the magnetic and electromagnetic components, as well as the fluid passages to be controlled thereby, are functionally complete. All that remains is complete an enclosure of the electromagnetic means 10, 25, 26, 27. Such enclosure is shown in FIG. 1 as a cupped cover 58 having a grooved peripheral flange for sealed engagement to ledge means 59 of the body block, and this sealed engagement may be compressionally loaded, as by a peripheral succession of spaced bolts (not shown). Finally, a preference is indicated for potting all unused voids within the described structure, the same being suitably accomplished by a vacuum-induced epoxy filling 60. And, to assure against the remote possibility of fluid leakage through an insufficiently bonded slab-to-slab interface, through-bores 60, 61 open at both ends of the body block 31 intercept the interface between slabs 51, 52 and the interface between slabs 52, 53, exposing any such leakage to ambient atmosphere.

The described structure will be seen to meet all stated objectives. In particular, the described structure and the described method of manufacture offer important advantages, some of which are listed below:

1. The so-called "dribble" volume, which is the volume of the outlet passages 14, 17 and of the connecting inlet passages (not shown) of any device, such as a rocket engine to be connected to the bottom surface of slab 15, must be minimized when the described multi-valve system is used to control the flow of rocket-engine propellants, in order to obtain high efficiency and highly repeatable operation of the rocket engine. The present invention allows outlet passages 14, 17 to be very close together (for example, 0.350-inch spacing, center-to-center, in a rocket engine that produces 0.25-lb. thrust). This feature allows the "dribble" volume of a mating rocket-engine injector to be very small indeed.

2. The friction or inertia-welding method referred to above is preferred, for any rocket-engine applications of the invention. This preference is stated with respect to any other alternative slab-joining techniques, such as the use of "filler" or "brazing" material. This preferred method thus specifically avoids any possible incompatability of a filler material with valve effluent(s).

3. The two valve members 11, 12 operate with near-simultaneity, even though one of these members may start to move before the other, due, for example, to preload tolerances, or pressure differences, or gap differences at 28/29. The near-simultaneity of these actions is attributable to the "magnetically linked" relation of the valve members to the involved magnetic circuit, in that the force on the lagging member increases or decreases quickly in the direction to foster simultaneous displacement of both valve members.

What is claimed is:

1. The method of making a magnetically actuated twin-valve system, wherein the system comprises a body block of three relatively thick slabs vertically bonded to each other to the consolidated height of their combined thicknesses, the first and lowermost slab being of non-magnetic material, the second and intermediate slab being of magnetic material, and the third and uppermost slab being of non-magnetic material, said body block being configured with two spaced upstanding and upwardly open guide bores on axes defining an upstanding vertical plane of symmetry, each of said bores defining in said first slab a separate valve-chamber wall with a valve-seat formation and outlet passage through an otherwise-closed lower-end, said first slab being further configured with two independent pressure-fluid inlet passages each of which communicates with one to the exclusion of the other of the valve-chamber walls, two valve members of magnetic material each of which has an upper cylindrical portion guided by one to the exclusion of the other of said guide bores and a reduced lower cylindrical portion in spaced relation to an associated chamber wall, said valve members being displaceable between a valve-open upper position and a valve-closed lower position of valve-seat engagement, and electromagnetic actuating means including a U-shaped core and having spaced downward legs that present pole faces located in the guide bores of said uppermost slab, said pole faces being in confronting relation with the upper cylindrical portion of each of said valve members, said method comprising in the construction of said body block the steps of:

(a) selecting said slab for predetermined thickness and relatively rough surface texture of the respective adjacent surfaces to be bonded into consolidation as said body block;

(b) inertia-welding said slabs to each other;

(c) then machining said bores for fitted assembly of said valve members thereto; and (d) welding said legs to the uppermost slab.

2. The magnetically actuated twin-valve system of claim 1, in which the lower end of each valve member carries a poppet element aligned for valve-seat coaction when in the valve-closed position.

3. The magnetically actuated twin-valve system of claim 1, in which spring means concentric with each of said axes compressionally preloads each valve member in reaction with its confronting pole face for resiliently setting the valve-closed position in the absence of exciting said electromagnetic actuating means.

4. The magnetically actuated twin-valve system of claim 3, in which for each valve member said spring means is a coil spring retained in an upwardly open bore in the valve member.

5. The magnetically actuated twin-valve system of claim 3, in which for each pole face said spring means is a coil spring retained in a downwardly open bore in the pole face.

6. The magnetically actuated twin-valve system of claim 3, in which for each valve member said spring means is a coil spring retained in an upwardly open bore in the valve member, and in which each said pole face has a downwardly open bore in retaining relation with the upper end of said spring means.

7. The magnetically actuated twin-valve system according to claim 1, in which each of said spaced downward legs is secured to said uppermost slab.

8. The magnetically actuated twin-valve system according to claim 7, in which said legs are welded to said uppermost slab.

9. The magnetically actuated twin-valve system according to claim 1, in which slabs are in interia-welded bonded consolidation to each other.

10. The magnetically actuated twin-valve system according to claim 1, in which said axes are inclined in said plane and at equal and opposite angles from a geometric normal to the uppermost slab.

11. The magnetically actuated twin-valve system according to claim 1, in which said body block is further configured with a transversely extending through-passage open to external ambient atmosphere and (1) on an alignment transverse to said plane of symmetry and (2) continuously exposed to the bonded adjacent surfaces of said first and second slabs and (3) intermediate said valve-chamber walls.

12. The magnetically actuated twin-valve system according to claim 11, in which said through-passage is one of two, the second of said through passages being similarly disposed except for continuous exposure to the bonded adjacent surfaces of said second and third slabs.

13. The method of making the magnetically actuated twin-valve system of claim 1, which method comprises selecting said slabs for predetermined thickness and relatively rough surface texture of the respective adjacent surfaces to be bonded into consolidation as said body block, inertia-welding said slabs to each other, then machining said bores for fitted assembly of said valve members thereto, and electron-beam welding said legs to the uppermost slab.

14. The method of claim 1, in which the welding of step (d) is electron-beam welding.

15. The method of making magnetically actuated twin-valve system, wherein the valve body comprises a body block of three relatively thick slabs vertically bonded to each other and to the consolidated height of their combined thicknesses, the first and lowermost slab being of non-magnetic material, the second and intermediate slab being of magnetic material, and the third and uppermost slab being of non-magnetic material, said method comprising the steps of:

(a) inertia-welding said slabs to each other;
(b) machining first and second spaced valve-member guide bores through said second and third slabs and through at least a portion of said first slab, with a valve-seat opening at the otherwise closed lower end of each bore of said first slab and with independent lateral-access inlet-port communication with the respective bores in said first slab;
(c) selecting and installing valve members of magnetic material for guidance in the respective bores;
(d) selecting electromagnetic actuating means including a U-shaped core having spaced downward legs that present pole faces located in the guide bores of the uppermost slab; and
(e) securing said legs to said uppermost slab with said pole faces in confronting relation with the upper end of each of the respective valve members.

16. The method of making a valve body for a magnetically actuated twin-valve system, wherein the valve body comprises a body block of three relatively thick slabs vertically bonded to each other and to the consolidated height of their combined thicknesses, the first and lowermost slab being of non-magnetic material, the second and intermediate slab being of magnetic material, and the third and uppermost slab being of non-magnetic material; the method comprises the steps of:

(a) inertia-welding said slabs to each other; and
(b) machining first and second spaced valve-member guide bores through said second and third slabs and through at least a portion of said first slab, with a valve-seat opening at the otherwise closed lower end of each bore of said first slab and with independent lateral-access inlet-port communication with the respective bores in said first slab.

* * * * *